US012374336B2

(12) United States Patent
Sharifi et al.

(10) Patent No.: US 12,374,336 B2
(45) Date of Patent: *Jul. 29, 2025

(54) COMBINING DEVICE OR ASSISTANT-SPECIFIC HOTWORDS IN A SINGLE UTTERANCE

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,352

(22) Filed: Feb. 29, 2024

(65) Prior Publication Data

US 2024/0203416 A1 Jun. 20, 2024

Related U.S. Application Data

(63) Continuation of application No. 17/118,783, filed on Dec. 11, 2020, now Pat. No. 11,948,565.

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01)

(58) Field of Classification Search
CPC ... G10L 15/22; G10L 2015/223; G10L 15/08; G10L 15/30; G10L 2015/088
See application file for complete search history.

(56) References Cited

U.S. PATENT DOCUMENTS

| 8,768,712 B1 * | 7/2014 | Sharifi | G10L 15/22 |
| | | | 704/270.1 |
| 10,204,627 B2 * | 2/2019 | Nitz | G10L 15/22 |

(Continued)

FOREIGN PATENT DOCUMENTS

JP 2020528566 A 9/2020

OTHER PUBLICATIONS

International Search Report and Written Opinion relating to Application No. PCT/US2021/059785, dated Mar. 15, 2022.

(Continued)

*Primary Examiner* — Mark Villena
(74) *Attorney, Agent, or Firm* — Honigman LLP; Brett A. Krueger

(57) ABSTRACT

A method for combining hotwords in a single utterance receives, at a first assistant-enabled device (AED), audio data corresponding to an utterance directed toward the first AED and a second AED among two or more AEDs where the audio data includes a query specifying an operation to perform. The method also detects, using a hotword detector, a first hotword assigned to the first AED that is different than a second hotword assigned to the second AED. In response to detecting the first hotword, the method initiates processing on the audio data to determine that the audio data includes a term preceding the query that at least partially matches the second hotword assigned. Based on the at least partial match, the method executes a collaboration routine to cause the first AED and the second AED to collaborate with one another to fulfill the query.

20 Claims, 9 Drawing Sheets

(56) References Cited

U.S. PATENT DOCUMENTS

| | | | |
|---|---|---|---|
| 10,366,692 B1 | 7/2019 | Adams et al. | |
| 10,681,460 B2* | 6/2020 | Woo | G06F 3/165 |
| 10,971,158 B1* | 4/2021 | Patangay | H04L 67/10 |
| 10,979,242 B2* | 4/2021 | Ocher | H04L 12/282 |
| 2016/0217785 A1 | 7/2016 | Kennewick et al. | |
| 2018/0204569 A1* | 7/2018 | Nadkar | G06F 3/167 |
| 2019/0287536 A1* | 9/2019 | Sharifi | G10L 15/22 |
| 2019/0311710 A1* | 10/2019 | Eraslan | H04L 67/568 |
| 2020/0007987 A1* | 1/2020 | Woo | G10L 15/22 |
| 2020/0184967 A1* | 6/2020 | Gupta | G10L 15/08 |
| 2020/0258512 A1 | 8/2020 | Smith et al. | |
| 2020/0372907 A1 | 11/2020 | Trufinescu et al. | |
| 2021/0020162 A1* | 1/2021 | Griffin | G10L 15/063 |
| 2021/0090572 A1* | 3/2021 | Mahmood | G06F 3/167 |
| 2021/0174794 A1* | 6/2021 | Mont-Reynaud | G10L 15/22 |
| 2021/0358496 A1* | 11/2021 | Sukumar | G10L 13/047 |
| 2022/0051666 A1* | 2/2022 | Rodriguez Bravo | G06F 3/017 |
| 2022/0157318 A1* | 5/2022 | Sharifi | G10L 15/22 |

OTHER PUBLICATIONS

USPTO Office Action relating to U.S. Appl. No. 17/118,783 dated Feb. 1, 2023.
USPTO Office Action relating to U.S. Appl. No. 17/118,783 dated Aug. 17, 2023.
Japanese Office Action for related application No. 2023-535767.

* cited by examiner

COMBINING DEVICE OR ASSISTANT-SPECIFIC HOTWORDS IN A SINGLE UTTERANCE

CROSS-REFERENCE TO RELATED APPLICATIONS

This U.S. patent application is a continuation of, and claims priority under 35 U.S.C. § 120 from, U.S. patent application Ser. No. 17/118,783, filed on Dec. 11, 2020. The disclosure of this prior application is considered part of the disclosure of this application and is hereby incorporated by reference in its entirety.

TECHNICAL FIELD

This disclosure relates to combining device or assistant-specific hotwords in a single utterance.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR

SUMMARY

One aspect of the disclosure provides a method for combining hotwords in a single utterance. The method includes receiving, at data processing hardware of a first assistant-enabled device (AED), audio data corresponding to an utterance spoken by the user and directed toward the first AED and a second AED among two or more AEDs associated with the user where the audio data includes a query specifying an operation to perform. The method also includes detecting, by the data processing hardware, using a hotword detection model, a first hotword in the audio data where the first hotword is assigned to the first AED and is different than a second hotword assigned to the second AED. In response to detecting the first hotword assigned to the first AED in the audio data, the method further includes initiating, by the data processing hardware, processing on the audio data to determine that the audio data includes one or more terms preceding the query that at least partially match the second hotword assigned to the second AED. Based on the determination that the audio data includes the one or more terms preceding the query that at least partially match the second hotword, the method additionally includes executing, by the data processing hardware, a collaboration routine to cause the first AED and the second AED to collaborate with one another to fulfill performance of the operation specified by the query.

Another aspect of the disclosure provides an assistant-enabled device that interprets hotwords combined in a single utterance. The device includes data processing hardware and memory hardware in communication with the data processing hardware. The memory hardware stores instructions that when executed on the data processing hardware cause the data processing hardware to perform operations. The operations include receiving audio data corresponding to an utterance spoken by the user and directed toward the first AED and a second AED among two or more AEDs associated with the user where the audio data includes a query specifying an operation to perform. The operations also include detecting, using a hotword detection model, a first hotword in the audio data where the first hotword is assigned to the first AED and is different than a second hotword assigned to the second AED. In response to detecting the first hotword assigned to the first AED in the audio data, the operations further include initiating processing on the audio data to determine that the audio data includes one or more terms preceding the query that at least partially match the second hotword assigned to the second AED. Based on the determination that the audio data includes the one or more terms preceding the query that at least partially match the second hotword, the operations additionally include executing a collaboration routine to cause the first AED and the second AED to collaborate with one another to fulfill performance of the operation specified by the query.

Implementations of either aspect of the disclosure may include one or more of the following optional features. In some implementations, initiating processing on the audio data in response to determining that the audio data includes the first hotword includes instructing a speech recognizer to perform speech recognition on the audio data to generate a speech recognition result for the audio data and determining, using the speech recognition result for the audio data, the one or more terms that at least partially match the second hotword are recognized in the audio data. In these implementations, instructing the speech recognizer to perform speech recognition on the audio data includes one of instructing a server-side speech recognizer to perform speech recognition on the audio data or instructing the speech recognizer to execute on the data processing hardware of the first AED to perform speech recognition on the audio data. In some examples, determining that the audio data includes the one or more terms preceding the query that at least partially match the second hotword assigned to the second AED includes accessing a hotword registry containing a respective list of one or more hotwords assigned to each of the two or more AEDs associated with the user and recognizing the one or more terms in the audio data that match or partially match the second hotword in the respective list of one or more hotwords assigned to the second AED. In these examples, the respective list of one or more hotwords assigned to each of the two or more AEDs in the hotword registry further includes one or more variants associated with each hotword and determining that the audio data includes the one or more terms preceding the query that at least partially match the second hotword includes determining that the one or more terms recognized in the audio data match one of the one or more variants associated with the second hotword. Also in these examples, the hotword registry may be stored on at least one of the first AED, the second AED, a third AED among the two or more AEDs associated with the user, or a server in communication with the two or more AEDs associated with the user.

In some configurations, determining that the audio data includes the one or more terms preceding the query that at least partially match the second hotword includes providing the audio data as input to a machine learning model trained to determine a likelihood of whether a user intended to speak the second hotword assigned to the user device. In some examples, when the one or more terms in the audio data preceding the query only partially match the second hotword, executing the collaboration routine causes the first AED to invoke the second AED to wake-up and collaborate with the first AED to fulfill performance of the operation specified by the query.

In some implementations, during execution of the collaboration routine, the first AED and the second AED collaborate with one another by designating one of the first AED or the second AED to generate a speech recognition result for the audio data, perform query interpretation on the speech recognition result to determine that the speech recognition result identifies the query specifying the operation to perform, and share the query interpretation performed on the speech recognition result with the other one of the first AED or the second AED. In other implementations, during execution of the collaboration routine, the first AED and the second AED collaborate with one another by each independently generating a speech recognition result for the audio data and performing query interpretation on the speech recognition result to determine that the speech recognition result identifies the query specifying the operation to perform. In some examples, the action specified by the query includes a device-level action to perform on each of the first AED and the second AED and, during execution of the collaboration routine, the first AED and the second AED collaborate with one another by fulfilling performance of the device-level action independently. In some configurations, the query specifying the action to perform includes a query for the first AED and the second AED to perform a long-standing operation and, during executing of the collaboration routine, the first AED and the second AED collaborate with one another by pairing with one another for a duration of the long-standing operation and coordinating performance of sub-actions related to the long-standing operation between first AED and the second AED to perform.

An additional aspect of the disclosure provides another method for combining hotwords in a single utterance. The method includes receiving, at data processing hardware of an assistant-enabled device (AED), audio data corresponding to an utterance spoken by the user and captured by the AED where the utterance includes a query for a first digital assistant and a second digital assistant to perform an operation. The method also includes detecting, by the data processing hardware, using a first hotword detection model, a first hotword in the audio data where the first hotword is assigned to the first digital assistant and is different than a second hotword assigned to the second digital assistant. The method further includes determining, by the data processing hardware, that the audio data includes one or more terms preceding the query that at least partially match the second hotword assigned to the second digital assistant. Based on the determination that the audio data includes the one or more terms preceding the query that at least partially match the second hotword, the method additionally includes executing, by the data processing hardware, a collaboration routine to cause the first digital assistant and the second digital assistant to collaborate with one another to fulfill performance of the operation.

Implementations of the disclosure may include one or more of the following optional features. In some implementations, determining that the audio data includes the one or more terms preceding the query that at least partially match the second hotword includes detecting, using a second hotword detection model, the one or more terms in the audio data that fully match the second hotword. In some examples, the method may further include, in response to detecting the first hotword in the audio data, initiating, by the data processing hardware, processing on the audio data to determine that the audio data includes the query for the first digital assistant and the second digital assistant to perform the operation by instructing a speech recognizer to perform speech recognition on the audio data to generate a speech recognition result for the audio data and performing query interpretation on the speech recognition result to determine that the speech recognition result identifies the query. Determining that the audio data includes the one or more terms preceding the query that at least partially match the second hotword may include determining, using the speech recognition result for the audio data, the one or more terms that at least partially match the second hotword are recognized in the audio data. The first digital assistant may be associated with a first voice service and the second digital assistant is associated with a second voice service, the first voice service and the second voice service offered by different entities. The first digital assistant and the second digital assistant may access different sets of resources associated with the user while collaborating with one another to fulfill performance of the operation.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
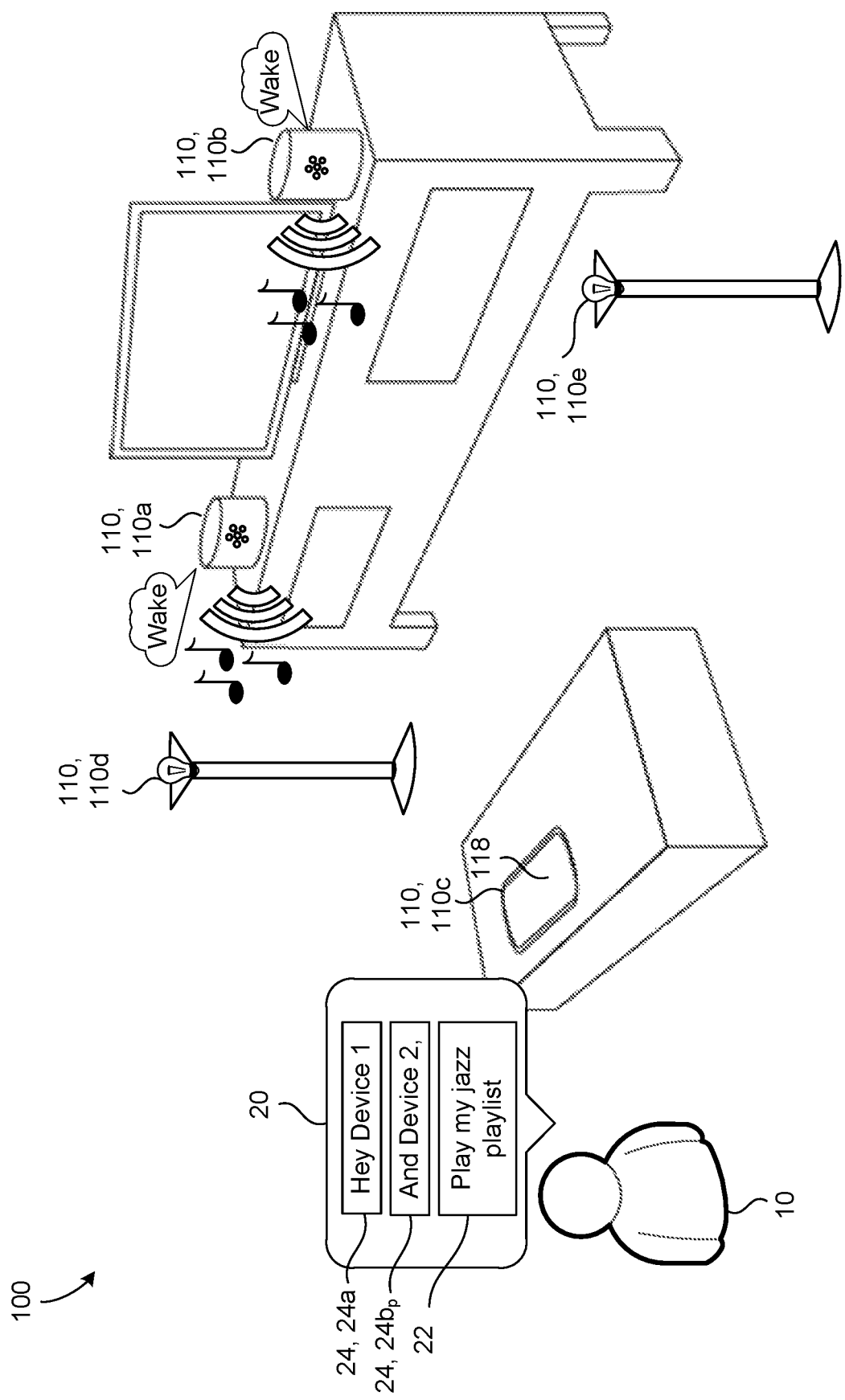
FIGS. 1A and 1B are schematic views of example speech environments where hotwords are combined in a single utterance.

Ideally, when conversing with a digital assistant interface, a user should be able to communicate as if the user were talking to another person, via spoken requests directed toward their assistant-enabled device running the digital assistant interface. The digital assistant interface will provide these spoken requests to an automated speech recognizer to process and recognize the spoken request so that an action can be performed. In practice, however, it is challenging for a device to always be responsive to these spoken requests since it is prohibitively expensive to run speech recognition continuously on a resource constrained voice-enabled device, such as a smart phone or a smart watch.

To create user experiences supporting always-on speech, assistant-enabled devices typically run compact hotword detection models configured to recognize audio features that characterize a narrow set of phrases, that when spoken by the user, initiate full automated speech recognition (ASR) on any subsequent speech spoken by the user. Advantageously, hotword detection models can run on low power hardware, such as digital signal processor (DSP) chips, and may respond to various fixed-phrase commands, such as "Hey Google" or "Hey living room speaker".

As the number of assistant-enabled devices within a user's environment (e.g., home or office) grows, the user may wish to trigger multiple assistant-enabled devices at the same time, e.g., to adjust a volume level across a group of assistant-enabled smart speakers or to adjust a lighting level across a group of assistant-enabled smart lights. Similarly, for a single assistant-enabled device that provides multiple different voice assistant services, the user may wish to trigger two or more of these voice services at the same time to fulfill a user query. Whether a user wants to trigger multiple different assistant-enabled devices or multiple different voice assistant services, the user is presently required to issue separate queries to each device or digital assistant service independently. For example, to turn off a kitchen light and a dining room light in the user's home, the user would have to speak separate queries such as, "Hey kitchen lightbulb, turn off" and "Hey dining room lightbulb, turn off".

Implementations herein are directed toward allowing users to combine multiple device-specific hotwords in a single utterance spoken by the user to trigger all the devices or digital assistant services to process a subsequent query in the utterance spoken by the user. Described in greater detail below, multiple co-located assistant-enabled devices (AED) in a user environment may collaborate with one another such that each AED may be configured to respond to a respective device-specific hotword and also detect/recognize a partial device-specific hotword on the behalf of one or more of the other co-located AEDs in the user environment. For instance, in a scenario where a user has two smart speakers that each respond to their own respective device-specific hotword (e.g., Hey device 1 and Hey device 2) and the user wants to play his or her jazz playlist on both speakers, the user could speak a single query "Hey device 1 and device 2, play my jazz playlist" to initiate playback of the requested playlist across both smart speakers. In this scenario, the user has spoken the complete device-specific hotword "Hey device 1," yet has only partially spoken the device-specific hotword for the second smart speaker (e.g. the term "hey" did not immediately prefix the spoken phrase "device 2"). Nonetheless, the first smart speaker detecting the phrase "Hey device 1" triggers the device to wake-up and initiate ASR to recognize the utterance spoken by the user. Since the two smart speakers are configured to pair and to collaborate with one another, the first smart speaker, which is now running ASR upon detecting the phrase "Hey device 1", can recognize the phrase "device 2" as a partial hotword match for the second smart speaker and determine that the user also intended to invoke the second smart speaker. In this scenario, the first smart speaker may instruct the second smart speaker to wake-up to also process the query and/or fulfil the query on the behalf of the second smart speaker so that songs from the jazz playlist play from both speakers simultaneously. Advantageously, the user only had to speak a single query directed to multiple AEDs at the same time, thereby saving the user time since the user did not have to provide multiple queries each directed to a different one of the AEDs.

Referring to FIGS. 1A-1D, in some implementations, a speech environment 100 includes a user 10 speaking an utterance 20 directed towards multiple assistant-enabled devices 110 (also referred to as a device 110, a user device 110, or an AED 110). Here, the utterance 20 spoken by the user 10 may be captured by one or more devices 110 in streaming audio 12 and may correspond to a query 22. For instance, the query 22 refers to a request to perform an action, operation, or task, and more specifically, a request for a digital assistant interface 120 executing on one or more of the devices 110 to perform an action, operation, or task. The user 10 may prefix the query 22 with one or more hotwords 24 and/or partial hotwords 24, $24_p$ as an invocation phrase to trigger one or more devices 110, 110a-n to wakeup from a sleep or hibernation state (i.e., a low-power state) when the one or more hotwords 24 are detected in the streaming audio 12 by a hotword detector 130 (FIGS. 1C and 1D) running on a respective device 110. In this sense, the user 10 may have conversational interactions with the digital assistant interface 120 executing on the AED device 110 to perform computing activities or to find answers to questions.

The device 110 may correspond to any computing device associated with the user 10 and capable of capturing audio from the environment 100. Some examples of user devices 110 include, but are not limited to, mobile devices (e.g., mobile phones, tablets, laptops, e-book readers, etc.), computers, wearable devices (e.g., smart watches), music players, casting devices, smart appliances (e.g., smart televisions) and internet of things (IoT) devices, remote controls, smart speakers, etc. The device 110 includes data processing hardware 112d and memory hardware 112m in communication with the data processing hardware 112d and storing instructions, that when executed by the data processing hardware 112d, cause the data processing hardware 112d to perform one or more operations related to speech processing.

Figure 1B:
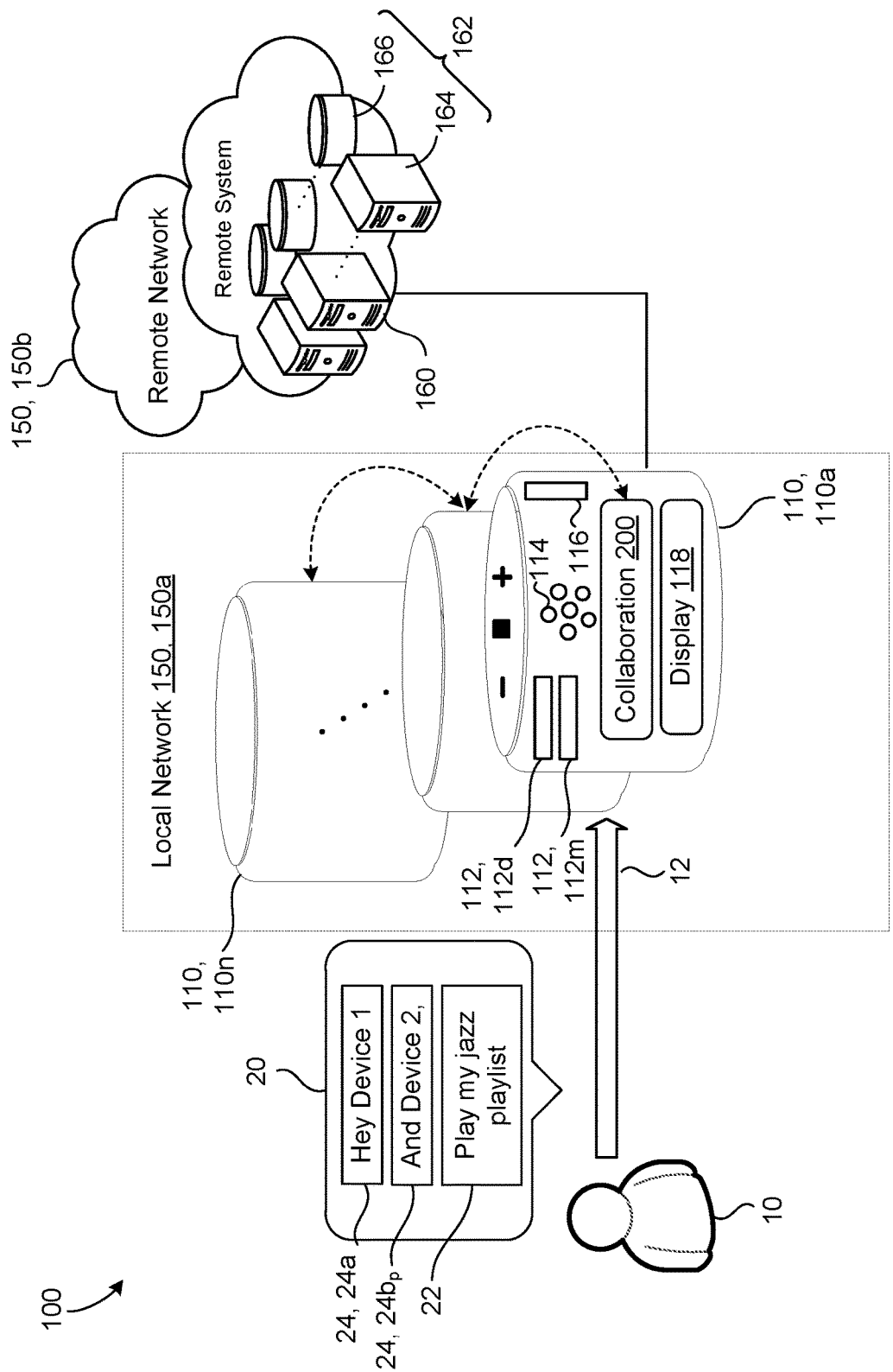
Figure 1C:
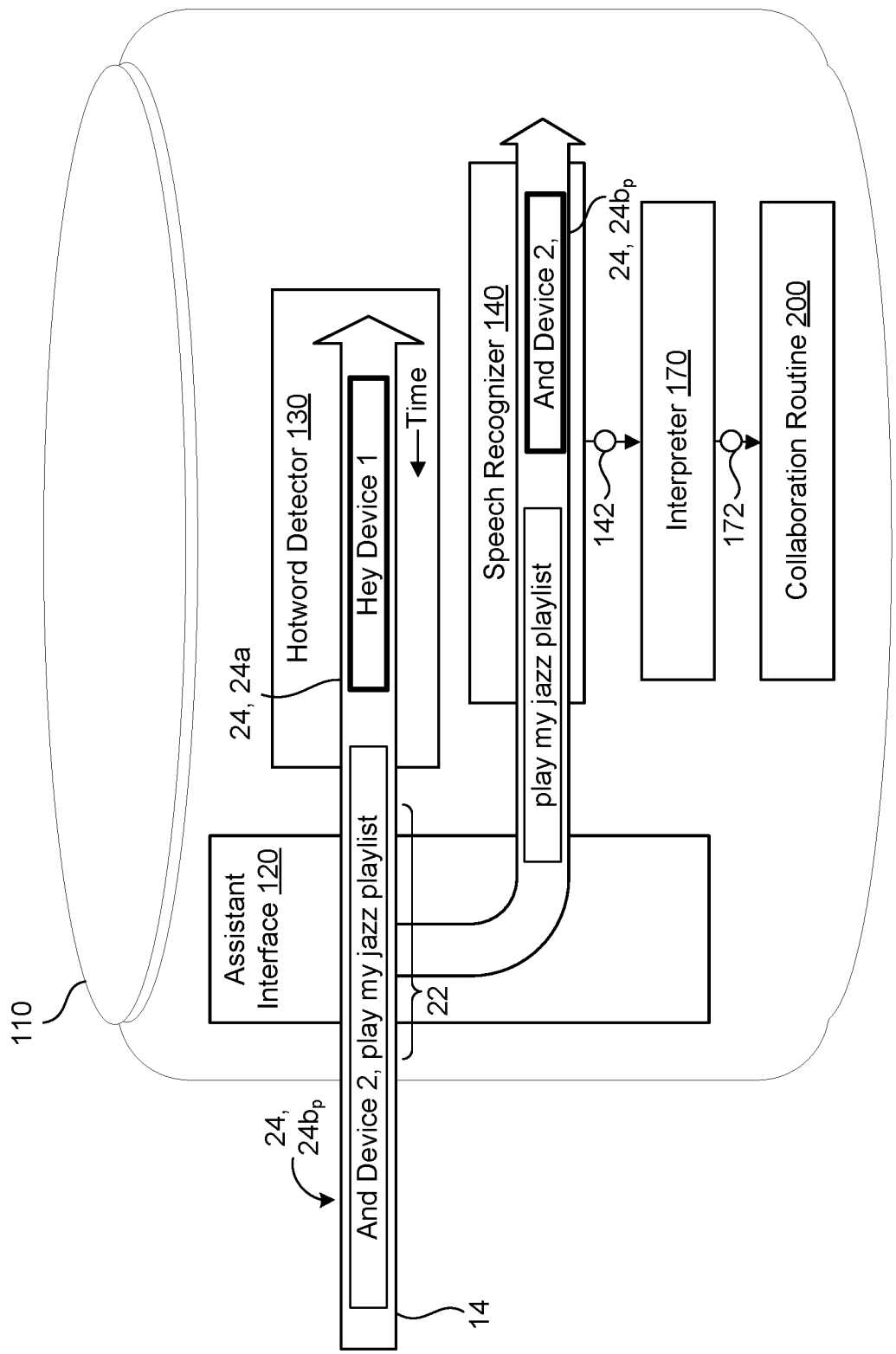
FIGS. 1C and 1D are schematic views of example assistant-enabled devices from the speech environments of FIGS. 1A and 1B.
Figure 1D:
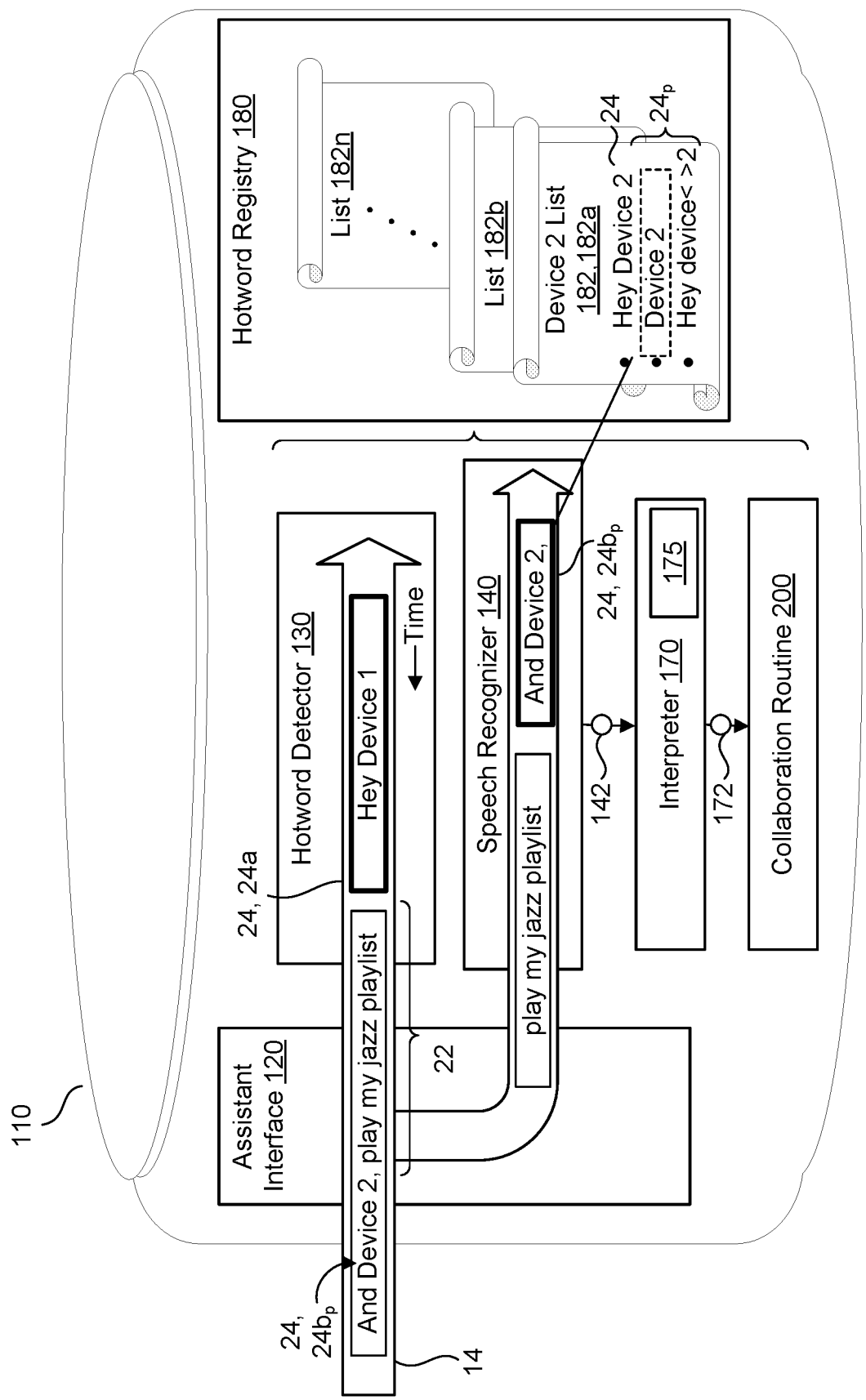

The device 110 further includes an audio subsystem with an audio capturing device (e.g., an array of one or more microphones) 114 for capturing and converting audio within the speech environment 100 into electrical signals referred to as audio data 14 (e.g., audio data 14 of FIGS. 1C and 1D). While the device 110 implements the audio capturing device 114 (also referred to generally as a microphone 114) in the example shown, the audio capturing device 114 may not physically reside on the device 110, but be in communication with the audio subsystem (e.g., peripherals of the device 110). For example, the device 110 may correspond to a vehicle infotainment system that leverages an array of microphones positioned throughout the vehicle. In addition to an audio capturing device 114, such as a microphone, the audio subsystem of the device 110 may also include an audio playback device 116, such as a speaker. With a speaker 116, the device 110 may play audio for the user 10 and/or the environment 100 where the device 110 is located. This may enable the device 110 (e.g., the assistant interface 120) to respond to a query 22 with synthesized playback audio output at one or more speakers 116 associated with the device 110. For instance, when the user 10 asks the assistant interface 120, "what is the weather like today?" the speaker 116 may output synthesized speech stating that "Today is sunny and 70 degrees".

The device 110 may also include a display 118 to display graphical user interface (GUI) elements (e.g., windows, screens, icons, menus, etc.) and/or graphical content. For example, the device 110 may load or launch applications that generate GUI elements or other graphical content for the display 118. These elements generated in the display 118 may be selectable by the user 10 and also serve to provide some form of visual feedback for processing activities/operations occurring on the device 110 or a visual response to the query 22. Furthermore, since the device 110 is a voice-enabled device 110, the user 10 may interact with elements generated on the display 118 using various voice commands. For instance, the display 118 may depict a menu of options for a particular application and the user 10 may use the interface 120 to select an option through speech.

To illustrate, the user 10 may direct an utterance 20 to two AEDs 110, 110d-e that correspond to two smart lightbulbs located in the living room of the user's home. Here, the user 10 may be watching a movie in the living room and may want to dim the lights in living room. In this scenario, the user 10 may speak a query, "Device 1 and device 2, dim the lights." Here, the query 22 is prefixed with a complete device-specific hotword ("device 1") associated with the first smart lightbulb 110d and a complete device-specific hotword ("device 2") associated with the second smart lightbulb 110e that triggers both of the devices 110d, 110e to wake-up and collaborate with one another to by fulfilling the operation specified by the query 22 independently, i.e., each smart lightbulb reduces its illumination to a level characteristic of dim lighting. Additionally or alternatively, in response to this query 22, one or both of the devices 110d, 110e instruct another device 110c to display a graphical user interface (GUI) on the display 118 that provides the user 10 with a slider GUI control/adjust the dim level of each of the lightbulbs 110d, 110e. To extend this example further, when the two devices 110 receive this query 22, they may execute the query 22 and collaborate with a third device 110, 110c, which is a mobile device 110c located near the user 10 and in communication with the first and/or second device 110d-e.

The speech-enabled interface (e.g., a digital assistant interface) 120 may field the query 22 or the command conveyed in the spoken utterance 20 captured by the device 110. The speech-enabled interface 120 (also referred to as interface 120 or an assistant interface 120) generally facilitates receiving audio data 14 corresponding to an utterance 20 and coordinating speech processing on the audio data 14 or other activities stemming from the utterance 20. The interface 120 may execute on the data processing hardware 112d of the device 110. The interface 120 may channel audio data 14 that includes an utterance 20 to various systems related to speech processing or query fulfillment.

In some examples, such as FIGS. 1C and 1D, the interface 120 communicates with the hotword detector 130, a speech recognizer 140, and/or an interpreter 170. The speech recognizer 140 may implement the interpreter 170 or the interpreter 170 may be a separate component. Here, the interface 120 receives audio data 14 corresponding to an utterance 20 and provides the audio data 14 to the hotword detector 130. The hotword detector 130 may include one or more hotword detection stages. For instance, the hotword detector 130 may include a first stage hotword detector that is "always-on" and configured to initially detect the presence of the hotword, and once a candidate hotword is detected, the first stage hotword detector may pass audio data 14 characterizing the candidate hotword 24 to a second stage hotword detector that confirms whether or not the audio data 14 includes the candidate hotword 24. The second stage hotword detector may reject the candidate hotword detected by the first stage hotword detector to thereby prevent the device 110 from waking up from a sleep or hibernation state. The first stage hotword detector may include a hotword detection model that executes on a digital signal processor (DSP) to coarsely listen for the presence of the hotword and the second stage hotword detector may include a more computationally-intensive hotword detection model than the first stage to accept or reject a candidate hotword detected by the first stage hotword detector. The second stage hotword detector may run on an application processor (CPU) that triggers upon the first stage hotword detector detecting the candidate hotword 24 in the streaming audio. In some examples, the second stage hotword detector includes the speech recognizer 140 performing speech recognition on the audio data 14 to determine whether or not the hotword 24 is recognized in the audio data 14.

When a hotword detection model associated with the hotword detector 130 detects that the audio data 14 corresponding to the utterance 20 includes a hotword 24 assigned to the device 110, the interface 120 (or the hotword detector 130 itself) may pass the audio data 14 to the speech recognizer 140 to initiate speech processing on the audio data 14. For instance, the interface 120 relays the audio data 14 to the speech recognizer 140 to initiate processing on the audio data 14 to determine whether the audio data 14 includes one or more terms preceding the query 22 of the utterance 20 that at least partially match a hotword 24 assigned to another device 110. Based on the determination that the audio data 14 includes one or more terms preceding the query 22 that at least partially match a different hotword 24 assigned to another device 110, the interface 120 may execute a collaboration routine 200 that causes the two devices 110 to collaborate with one another to fulfill performance of the operation specified by the query 22.

Referring to the example of FIG. 1A with reference to FIGS. 1C and 1D, the utterance 20 spoken by the user 10 includes, "hey device 1 and device 2, play my jazz playlist." Here, the utterance 20 includes a first hotword 24, 24a "hey device 1" assigned to a first device 110, 110a, that when detected in the audio data 14, triggers the interface 120 executing on the first device 110a to relay subsequently captured audio data 14 corresponding to the terms "and device 2, play my jazz playlist" to the speech recognition system 140 for processing. That is, the first device 110a may be in a sleep or hibernation state and run the hotword detector 130 to detect the presence of a hotword 24 or a partial hotword 24, 24p in the audio stream 12. For instance, "device 2" may be considered a partial hotword 24p for the second device 110b because the full/complete hotword 24 assigned to the second device 110b includes the phrase "hey device 2". Thus, the utterance 20 lacks the first term, "hey," of the full hotword phrase "hey device 2" such that the terms "device 2" are associated with a partial hotword $24_p$ of the entire/complete hotword 24. As used herein, a hotword 24 may generally refer to either a full hotword 24 or a partial hotword $24_p$. Serving as an invocation phrase, the hotword 24, when detected by the hotword detector 130, triggers the device 110 to wake-up and initiate speech recognition on the hotword 24 and/or one or more terms following the hotword 24 (e.g., the terms "and device 2, play my jazz playlist"). For example, since the utterance 20 includes a first hotword 24a assigned to the first device 110a and a second hotword 24b (e.g., a partial hotword $24_p$) assigned to the second device 110b, FIG. 1A depicts the first and second device 110a-b waking up and collaborating with one another to play music from the jazz playlist of the user 10, while a third device 110c, although within close enough proximity to the user 10 to capture the utterance 20, does not wake up because the utterance 20 does not include any hotwords 24 that are assigned to the third device 110c. In this example, because the utterance 20 includes the one or more terms that only partially match the second hotword $24b_p$, the hotword detector 130 running on the second device 110b will not detect the presence of the hotword and trigger the second device 110b to wake-up. Instead, the first device 110a initiates speech recognition and performs semantic interpretation on the ASR result 142 for the audio data to identify the one or more terms "device 2" that partially match the second hotword "hey device 2", and then invokes the second device 110b to wake-up and collaborate with the first device 110a to fulfil the operation of playing back the jazz playlist as specified by the query 22.

With reference to FIGS. 1C and 1D, to perform hotword detection, the hotword detector 130 includes a hotword detection model, such as a neural network-based model, configured to detect acoustic features indicative of the hotword 24 without performing speech recognition or semantic analysis. By using a hotword detector 130, detection of the hotword 24 may occur at low powered hardware, such as a DSP chip, which avoids consuming a device's computing processing units (CPUs) (e.g., associated with the data processing hardware 112d). As aforementioned, a first stage hotword detector may run on the DSP chip to initially detect the presence of a candidate hotword, and then invoke the CPU to wake-up and execute a second stage hotword detector (hotword detection model or speech recognizer) to confirm the presence of the hotword. When the detector detects a hotword 24, the hotword 24 may trigger the device to wake-up and initiate speech recognition that demands more expensive processing (e.g., ASR and natural language understanding (NLU)). Here, the device may perform on-device ASR by executing the speech recognizer 140 on the data processing hardware 112d (e.g., CPU). Optionally, the device 110 may establish a network connection with a server (e.g., remote system 160 of FIG. 1B) and provide the audio data 14 to the server to perform server-side ASR and/or NLU on the audio data 14. In some implementations, each device 110 in the environment 100 runs its own hotword detector 130.

In response to the hotword detector 130 detecting the hotword 24 in the audio data 14, the interface 120 relays the audio data 14 corresponding to this utterance 20 to the speech recognizer 140 and the speech recognizer 140 performs speech recognition on the audio data 14 to generate an automated speech recognition (ASR) result (e.g., transcription) 142 for the utterance 20. The speech recognizer 140 and/or the interface 120 may provide the ASR result 142 to the interpreter 170 (e.g., a NLU module) to perform semantic interpretation on the ASR result 142 to determine that the audio data 14 includes the one or more terms "device 2" that partially match the second hotword "hey device 2" assigned to the second device 110b. Accordingly, based on the determination that the audio data 14 includes the one or more terms partially matching the second hotword 24, $24b_p$, the interpreter 170 determines that the utterance 20 was also directed toward the second device 110b and thereby provides an instruction 172 to initiate execution of the collaboration routine 200 to invoke the second device 110b to wake-up and collaborate with the first device 110a. Notably, if the utterance 20 were to instead include all the terms "hey device 2" for the second hotword 24, the hotword detector 130 running on the second device 110b may have detected the second hotword and triggered the second device 110b to also wake-up and perform speech recognition and semantic interpretation independently, and thereby execute the collaboration routine 200 to collaborate with the first device 110a to fulfill the operation specified by the ensuing query 22.

In this example, the query 22 includes a query for the first and second devices 110a, 110b to perform a long-standing operation of streaming the jazz music playlist for audible playback. Accordingly, during execution of the collaboration routine 200, the first and second devices 110a, 110b may collaborate with one another by pairing with one another for a duration of the long-standing operation and coordinating performance of sub-actions related to the long-standing operation between the first and second devices 110a, 110b. In other words, since the query 22 corresponds to a music playing command, the collaboration routine 200 may cause the first device 110a and the second device 110b pair with one another and audibly playback songs from the user's jazz playlist in a stereo arrangement, whereby the first device 110a assumes the role of a left audio channel as a sub-action and the second device 110b assumes the role of a right audio channel as a sub-action.

In some implementations, as shown in FIG. 1B, the device 110 communicates via a network 150 with a remote system 160. The remote system 160 may include remote resources 162, such as remote data processing hardware 164 (e.g., remote servers or CPUs) and/or remote memory hardware 166 (e.g., remote databases or other storage hardware). The device 110 may utilize the remote resources 162 to perform various functionality related to speech processing and/or query fulfillment. For instance, some or all of the functionality of the speech recognizer 140 may reside on the remote system 160 (i.e., server-side). In one example, the speech recognizer 140 resides on the device 110 for performing on-device automated speech recognition (ASR). In another example, the speech recognizer 140 resides on the remote system 160 to provide server-side ASR. In yet another example, functionality of the speech recognizer 140 is split across the device 110 and the server 160.

In some configurations, the speech recognizer 140 may reside in a different location (e.g., on-device or remote) depending on a type of speech recognition model used during speech recognition. An end-to-end or streaming-based speech recognition model may reside on the device 110 due to its space-efficient size while a larger, more conventional speech recognition model that is constructed from multiple models (e.g., an acoustic model (AM), a pronunciation model (PM), and a language model (LM)) may be a server-based model that resides in the remote system 140 rather than on-device. In other words, depending on the desired level of speech recognition and/or desired speed to perform speech recognition, the interface 120 may instruct speech recognition by the speech recognizer 140 to occur on-device (i.e., user-side) or remotely (i.e., server-side).

In some examples, such as FIG. 1B, the environment 100 includes a first network 150, 150a, and a second network 150, 150b. Here, the first network 150a may correspond to a local area network (LAN), such as a personal network associated with the user's home. As a LAN, the first network 150a may refer to a local network layer where multiple devices 110, 110a-n associated with the user 10 are connectable to each other and/or configured to communicate with each other. For example, the devices 110 connect to each other using wired and/or wireless communication protocol, such as WiFi, Bluetooth, Zigbee, Ethernet, or other radio-based protocols. In the first network 150a, one device 110 may broadcast information (e.g., instructions associated with the collaboration routine 200) to one or more other devices 110 to fulfill a query 22. The devices 110 may be setup to communicate with each other in a discovery process to establish a means of communication upon initiation into the network 150a or may undergo the pairing process with each other in response to a query 22 that invokes a particular set of devices 110. The first network 150a or local network may also be configured to communicate with a second network 150b or remote network. Here, the remote network may refer to a wide area network (WAN) that extends over a large geographic area. By being able to communicate with the second network 150b, the first network 150a may communicate with or have access to the remote system 160; allowing one or more device 110 to perform services, such as server-side speech recognition, server-side hotword detection, or some other type of server-side speech processing or query fulfillment. In some configurations, a supervisor (e.g., computer-based software) may be configured to coordinate devices 110 operating on the first network 150a or local network that are associated with the user 10, such that the supervisor may recognize that an utterance 20 from the user 10 has awoken more than one device 110 and the supervisor facilitates or initiates the collaboration routine 200 between the awoken devices 110.

Referring to FIG. 1D, in some implementations, the interpreter 170 determines that the audio data 14 includes the one or more terms preceding the query 22 that at least partially match the second hotword 24 "hey device 2" assigned to the second AED by: accessing a hotword registry 180 that contains a respective list 182, 182a-n of one or more hotwords assigned to each device 110, 110a-n associated with the user 10; and identifying that the ASR result 142 for the audio data 14 includes the one or more terms that match or partially match the second hotword "hey device 2" in the respective list 182a of the one or more hotwords assigned to the second device 110b. The hotword registry 180 accessed by the interpreter 170 may be stored on one of the devices 110, more than one of the devices, and/or a central server (e.g., the remote system 160 (FIG. 1B)) in communication with all the devices 110 via the network 150 (FIG. 1). Thus, each device 110 may (1) store a device-specific hotword registry 180 that only includes hotwords 24 for that particular device 110; (2) store a global hotword registry 180 with hotwords 24 for all devices 110 associated with the user 10; or (3) not store any hotword registry 180. When a particular device 110 includes the global hotword registry 180, the device 110 may function as a local centralized storage node for hotwords 24 assigned to devices 110 of the user 10. Devices not storing the global hotword registry 180 may access the global hotword registry 180 stored on one or more other devices 110 via the local network 150a or may access a global hotword registry residing on the remote system 160. Devices 110 may actively update the hotword registry 180 when new hotwords 24 are active/available and/or when hotwords 24 become inactive/not available.

In some examples, the respective list 182 of hotwords 24 assigned to each device 110 in the hotword registry 180 includes one or more variants associated with each hotword 24. Here, each variant of a hotword 24 assigned to a particular device 10 may correspond to a partial hotword $24_p$ for that device. Continuing with the example, FIG. 2D shows the respective list 182a of hotwords 24 assigned to the second device 110b including the hotword "Hey Device 2", and variants "Device 2" and "Hey device < . . . > 2 that correspond to partial hotwords $24_p$. Thus, the interpreter 170 running on the first device 110a may access the hotword registry 180 and identify that the respective list 182a associated with the second device 110b lists the variant "Device 2" as a partial hotword $24_p$ matches the one or more terms in the ASR result 142. Notably, the list 182a lists the variant "Hey device < . . . > 2" as a complex expression to allow for the partial match with the second hotword "Hey device 2" when a user prefixes a query with "Hey Device 1 and 2" or "Hey device 1 and device 2".

As mentioned in the remarks above, when a user 10 only partially speaks a hotword, a hotword detector 130 running on the particular device 110 will not detect the presence of the hotword 24, and thus will not trigger the device 110 to wake up when only a partial hotword $24_p$ is spoken by the user 10. To illustrate further, when a hotword detector 130 is performing hotword detection, the hotword detector 130 generates a hotword score that indicates a confidence level that a particular hotword 24 is present in streaming audio. When the hotword score satisfies a threshold (e.g., exceeds a particular threshold value), the hotword detector 130 identifies that the complete hotword 24 is present in the streaming audio. However, when only a partial hotword $24_p$ is present in the streaming audio, the hotword detector 130 may generate a corresponding hotword score that fails to satisfy the threshold. As a result, the hotword detector 130 will not detect the hotword 24 and the device 110 will remain in a sleep or hibernation state. To avoid this outcome, the interpreter 170 may access the hotword registry 180 to determine that one or more terms recognized in audio data 14 (e.g., one or more terms in the ASR result 142) match a variant associated with a hotword 24. This match can effectively boost the confidence score to trigger the device 110 to now wake-up and collaborate with one or more other devices 110 that the query 22 was directed toward to fulfill an operation specified by the query 22.

In some examples, an AED 110 that detects its hotword in audio data executes a machine learning model 175 to determine whether or not the audio data 14 corresponding to an utterance 20 also refers to a hotword assigned to another AED. Accordingly, the machine learning model 175 is trained to detect partial hotwords in audio data. The machine learning model 175 may receive the audio data 14 as input and determine a likelihood of whether the user 10 intended to speak a hotword assigned to another AED. The machine learning model may be trained on expected hotword utterances for one or more hotwords and variants thereof. The machine learning model may include a neural network or an embedding-based comparison model where an embedding of the audio data 14 is compared with embeddings for expected hotword utterances.

Figure 2:
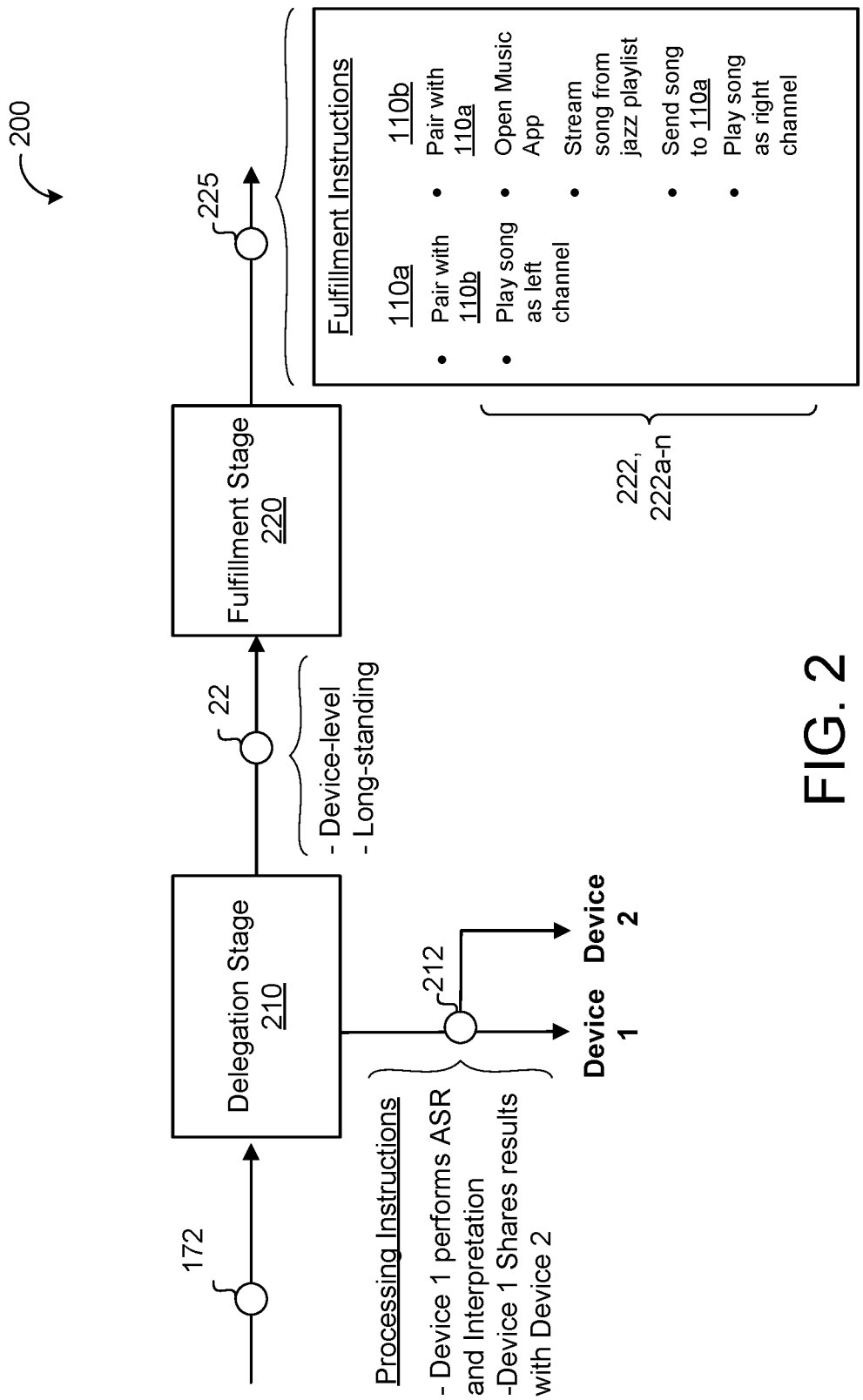
FIG. 2 is an example collaboration routine executing in a speech environment.

Referring to FIG. 2, the collaboration routine 200 executes in response the assistant interface 120 providing the instruction 172 indicating that the speech recognition result 142 includes one or more terms that at least partially match a hotword assigned to another device 110. The instruction 172 may include identifiers associated with each of the two or more devices 110, 110a-n that the utterance 20 was directed toward. The instruction 172 may further include the speech recognition result 142. When one or more terms in audio data only partially match a hotword assigned to a device 110, 110b, executing the collaboration routine 200 may cause the triggered device 110, 110a to invoke the other device 110b to wake-up and collaborate with the first device 110a to fulfill performance of the operation specified by the query 22. For instance, when the collaboration routine 200 receives the instruction 172 from the interpreter 170 indicating that the ASR result 142 includes terms that only partially match the hotword assigned to the second device 110b, the collaboration device 200 can invoke the second device 110b to wake-up.

The collaboration routine 200 may include a delegation stage 210 and a fulfillment stage 220. During the delegation stage 210, the collaborating devices 110, 110a-b collaborate with one another by designating processing instructions to at least one of the collaborating devices. For simplicity, there are two collaborating devices 110 corresponding to the first device 110a and the second device 110b, however, other examples may include more than two collaborating devices 110 when the interpreter determines that the utterance was directed to more than two devices 110. The processing instructions 212 may designate the first collaborating device 110a to: generate an ASR result 142 for the audio data 14; perform query interpretation on the ASR result 142 to determine that the ASR result 142 identifies the query 22 specifying the operation to perform; and share the query interpretation performed on the ASR result 142 with the other collaborating device 110b. In this example, the audio data 14 may have only included one or more terms that partially match the hotword assigned to the second device 110b, and therefore, the delegation stage 210 may decide to let the first device 110a continuing processing the audio data 14 to identify the query 22 specifying the operation to perform while simultaneously invoking the second device 110b to wake-up and collaborate with the first device 110a. In other examples, the processing instructions 212 may instead allow the collaborating devices to collaborate with one another by each independently generating the ASR result 142 for the audio data 14 and performing query interpretation on the ASR result 142 to identify the query 22.

When a collaborating device 110 performs some aspect of speech processing and/or query interpretation while another device does not perform that aspect, the routine 202 may designate which collaborating device 110 needs to share information with another collaborating device 110 in order to coordinate execution of the routine 202. For example, if the first device 110a performs query interpretation on the query 22, "play my jazz playlist," the second device 110b will be unaware of this query interpretation until the interpretation is shared with the second device 110b. Furthermore, if the routine 202 designates that the first device 110a performs speech processing and the second device 110b performs query interpretation, the second device's action depends on the first device's action such that the first device 110 would need to share the speech recognition results 142 with the second device 110b to enable the second device 110b to perform query interpretation.

When issuing the processing instructions 212, the delegation stage 210 may evaluate the capabilities of each collaborating device 110, such as processing capabilities, power usage, battery level, ASR models available at the devices 110, the ability of each device 110 to perform ASR locally or remotely, or any other capability/parameter associated with the devices 110. For example, a particular collaborating device 110 may inherently have greater processing resources to perform resource intensive operations. In other words, when the first device 110a is a device 110 with limited processing resources, such as a smart watch, and the second device 110b is a tablet, the smart watch may be much more constrained on processing resources than the tablet. Therefore, when one of the collaborating devices 110 is a smart watch, the delegation stage 210 may designate performance of speech processing and query interpretation on other collaborating devices 110, whenever possible.

The fulfillment stage 220 receives the query 22 interpreted from the audio data 14 by at least one of the collaborating devices 110. In some examples, the query 22 specifies a device-level action to perform on each of the collaborating devices 110. For instance, a query 22 directed toward the smart lights 110d, 110e of FIG. 1 that specifies the operation to dim the lights, corresponds to a device-level query where the fulfillment stage 220 would instruct the smart lights 110d, 110e to collaborate with one another by each independently reducing their illumination to a level characteristic of dim lighting.

In other examples, the query 22 specifies a long-standing operation to be performed jointly by the collaborating devices 110. Performing the long-standing operation may require the devices 110 to collaborate in performing a number of sub-actions 222, 222a-n related to the long-standing operation. As such, the collaborating devices 110 may collaborate with one another by pairing with one another for a duration of the long-standing operation and coordinating performance of the sub-actions 222 related to the long-standing operation between each of the collaborating devices 110. Accordingly, the fulfillment stage 220 identifies the sub-actions 222 related to the long-standing operation and coordinates performance of the sub-actions between the collaborating devices 110.

Continuing with the example earlier, the query 22 specifies the long-standing operation to audibly playback the user's jazz playlist on the first and second devices 110a, 110b corresponding to smart speakers located in the user's living room. To perform this long-standing operation, the fulfillment stage 220 identifies the sub-actions 222 related to the long-standing operation and generates fulfillment instructions 225 that cause the first device 110a and the second device 110b to pair with one another and coordinate the performance of the sub-actions 222 related to the long-standing operation between the first device 110a and the second device 110b. For instance, to play the user's jazz playlist, the playlist of jazz music may be either accessed locally (e.g., the playlist is stored on one of the devices 110a-b), accessed from a network storage device (not shown) on the local network 150a (FIG. 1), or streamed from a music streaming service residing on some remote server. For this example, the user's jazz playlist is a playlist in a streaming music application associated with the music streaming service. Here, fulfillment instructions 225 may instruct the second device 110b to perform sub-actions of launching the music streaming application, connecting with the remote music streaming service to stream a current song from the jazz music playlist over the remote network, send/stream the song to the first device 110a, and assume the audio playback responsibility of playing the current song as a left audio channel. On the other hand, the fulfillment instructions 225 instruct the first device 110a to only perform the sub-action 222 of assuming the audio playback responsibility of playing the current song streamed from the second device 110b as a right audio channel. Accordingly, the fulfillment instructions 225 coordinate the performance of the sub-actions between the first and second device 110a, 110b to fulfill the long-standing operation such that the two devices 110a, 110b playback the music in a stereo arrangement. The sub-actions 222 corresponding to streaming songs from the playlist then repeat until the long-standing operation terminates (e.g., when the playlist ends or the user 10 stops music playback at the devices 110a-b). When the long standing operation terminates, the devices 110 may decouple (e.g., cease their paired connection) and revert to low-power states (e.g., sleep or hibernation state).

Figure 3:
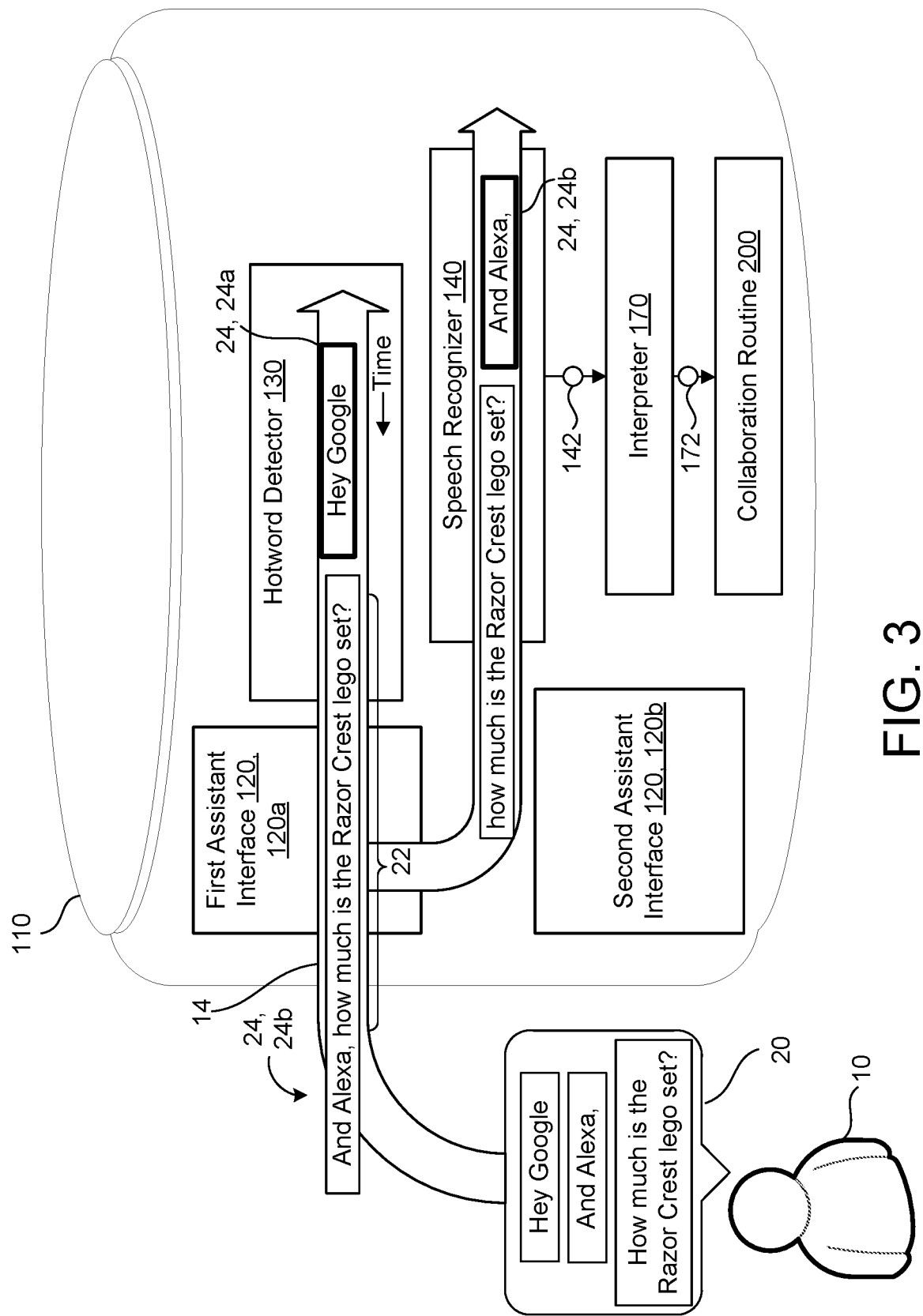
FIG. 3 is a schematic view of an example assistant-enabled device that includes more than one digital assistant.

FIG. 3 is an example of combining multiple hotwords 24 into a single utterance 20 similar to the examples of FIGS. 1A-1D. FIG. 3 differs from the examples of FIGS. 1A-1D in that, instead of each of the multiple hotwords 24 corresponding to different devices 110, the multiple hotwords 24 correspond to different assistance interfaces 120. Namely, the multiple hotwords 24 combined in a single utterance 20 are not device-specific, but rather interface-specific. Assistant interfaces 120 may refer to one or more applications running on the data processing hardware 112d of the device 110. For instance, an interface 120 is an application programming interface (APIs) that interfaces with different applications, such as media applications (e.g., video streaming applications, audio streaming applications, media player applications, media gallery applications, etc.), word processing applications, navigation applications, social media applications, communication applications (e.g., messaging applications, email applications, etc.), financial applications, organizational applications (e.g., address book applications), retail applications, entertainment applications (e.g., news applications, weather applications, sport applications), casting applications, etc. Some interfaces 120 are proprietary software developed by companies to interface with their applications or, perhaps, to include some degree of functionality unique to the business offerings of that particular company. As shown in FIG. 3, two more common assistant interfaces 120 are offered by GOOGLE (e.g., referred to as Google Assistant) and AMAZON (e.g., referred to as Alexa). Each interface 120 may have its own unique set of hotwords 24 to trigger the interface 120 to perform operations, tasks, or actions associated with a query 22 received in an utterance 20 spoken by the user 10 to the assistant interface 120.

Because each interface 120 may have different compatibility with other applications in communication with the device 110 or have its own set of unique advantages, users 10 of devices 110 may often use more than one interface 120 on a particular device 110. Moreover, a user 10 may even use two different interfaces 120 to perform the same action in order to compare the results/response or to obtain multiple vantage points for a particular query 22. For instance, a user 10 may think that the weather reporting functionality of a first interface 120, 120a is more accurate than the weather reporting functionality of a second interface 120, 120b with respect to stormy or weather causing precipitation, while the weather reporting functionality of the second interface 120, 120b is more accurate than the weather reporting functionality of the first interface 120, 120a with respect to humidity and warm weather. With this view, a user 10 may combine what would normally be two separate utterances 20 "Hey Google, what is the weather like today?" and "Alexa, what is the weather like today?" into a single utterance 20 of "Hey Google and Alexa, what is the weather like today?" In FIG. 3, the example refers to a shopping question. Here, the user 10 may query 22 both Amazon and Google for the price of a lego set to compare pricing or to collect more data about pricing in the market by saying, "Hey Google and Alexa, how much is the Razor Crest lego set?"

Although the hotword 24 is interface-specific instead of device-specific, the other features of the device 110 function the same. For instance, with an interface-specific hotword 24, the device 110, as can be seen in FIG. 3, includes the hotword detector 130, the speech recognition 140 and the collaborator 200. In other words, the device 110 receives audio data 14 corresponding to an utterance 20 spoken by the user 10 and the hotword detector 130 detects a first hotword 24, 24a, "Hey Google," in the audio data 14 where the first hotword 24, 24a is assigned to a first digital assistant 120a. The speech recognizer 140 generates an ASR result 142 for the audio data 14 and the interpreter 170 determines whether the ASR result 142 for the audio data 14 includes one or more terms proceeding the query 22 that at least partially match a second hotword 24 assigned to the second digital assistant 120b (e.g., assigned to Alexa). The interpreter 170 may access a hotword registry 180 as discussed above to determine that the term "Alexa" matches the hotword assigned to the second digital assistant 120b.

Based on the determination that the audio data 14 includes the one or more terms preceding the query 22 that at least partially match one or more second hotwords 24 assigned to the second digital assistant 120b, the interpreter 170 sends an instruction 172 to initiate the collaboration routine 200 to cause the first digital assistant 120a and the second digital assistant 224 to collaborate with one another to fulfill performance of the operation. In contrast to the examples of FIG. 1A-1D, the multiple digital assistant interfaces 120 (e.g., the first and the second digital assistant interfaces 120a-b) collaborate to fulfill performance of operations associated with a query 22 instead of the devices 110. This means that actions or sub-actions 222 of a query 22 may be performed by more than one interface 120 in parallel (e.g., simultaneously).

When multiple interfaces 120 are fulfilling the performance of an operation corresponding to a query 22, different interfaces 120 may fulfill the query 22 in different ways. For example, one interface 120 may be associated with different services than another interface 120 or one interface 120 may generate different fulfillment results because that interface 120 has access to different resources than another interface 120. In some implementations, different interfaces 120 perform or control different kinds of actions for the device 110. For instance, one interface 120 may perform a device-level action in one manner and another interface 120 may perform the same device-level action in a different manner. To illustrate, if the user 10 spoke the utterance 20, "Hey Google and Alexa, turn off data logging." The query 22 in this utterance 20 is akin to the prior lighting example where a first interface 120a associated with Google deactivates the data logging functionality of the first interface 120a, but does not deactivate data logging at the second interface 120b corresponding to Amazon. Instead, the second interface 120b, like the first interface 120a independently deactivates its data logging functionality.

Besides operating independently, multiple interfaces 120 may collaborate to synchronize responses. For instance, when a first interface 120a responds to a search query 22 of "what is the weather is going to be like today," with "today's forecast is sunny," the second interface 120b may be configured to collaborate with the first interface 120 by confirming (e.g., "I agree") or dissenting from the response of the first interface 120a. Moreover, a portion of the response may be provided from the one interface and another portion of the responses may be obtained from the other interface to provide a more detailed response to the user.

Figure 4:
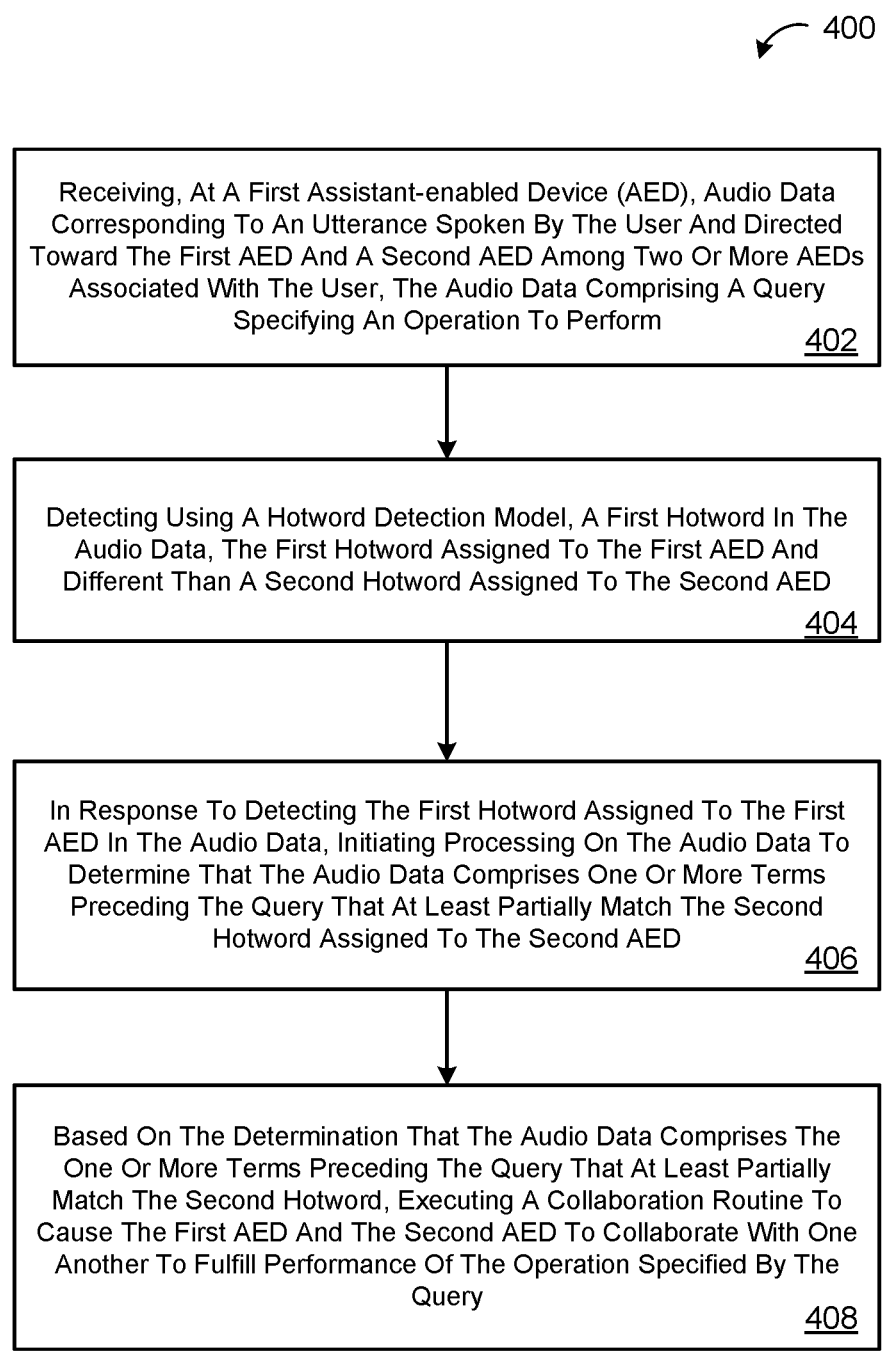
FIG. 4 is a flowchart of an example arrangement of operations for a method of combining device specific hotwords in a single utterance.

FIG. 4 is a flowchart of an example arrangement of operations for a method 400 of combining device-specific hotwords 24 in a single utterance 20. At operation 402, the method 400 receives, at data processing hardware 112d of a first AED device 110, 110a, audio data 14 corresponding to an utterance 20 spoken by the user 10 and directed toward the first AED 110a and a second AED 110, 110b among two or more AEDs 110, 110a-n associated with the user 10 where the audio data 14 includes a query 22 specifying an operation to perform. At operation 404, the method 400 detects, using a hotword detection model, a first hotword 24, 24a in the audio data 14 where the first hotword, 24a is assigned to the first AED 110a and is different than a second hotword 24, 24b assigned to the second AED 110b. In response to detecting the first hotword 24a assigned to the first AED 110*a* in the audio data 14, at operation 406, the method 400 initiates processing on the audio data 14 to determine that the audio data 14 includes one or more terms preceding the query 22 that at least partially matches the second hotword 24*b* assigned to the second AED 110*b*. Based on the determination that the audio data 14 includes the one or more terms preceding the query 22 that at least partially matches the second hotword 110*b*, at operation 408, the method 400 executes a collaboration routine 202 to cause the first AED 110*a* and the second AED 110*b* to collaborate with one another to fulfill performance of the operation specified by the query 22.

Figure 5:
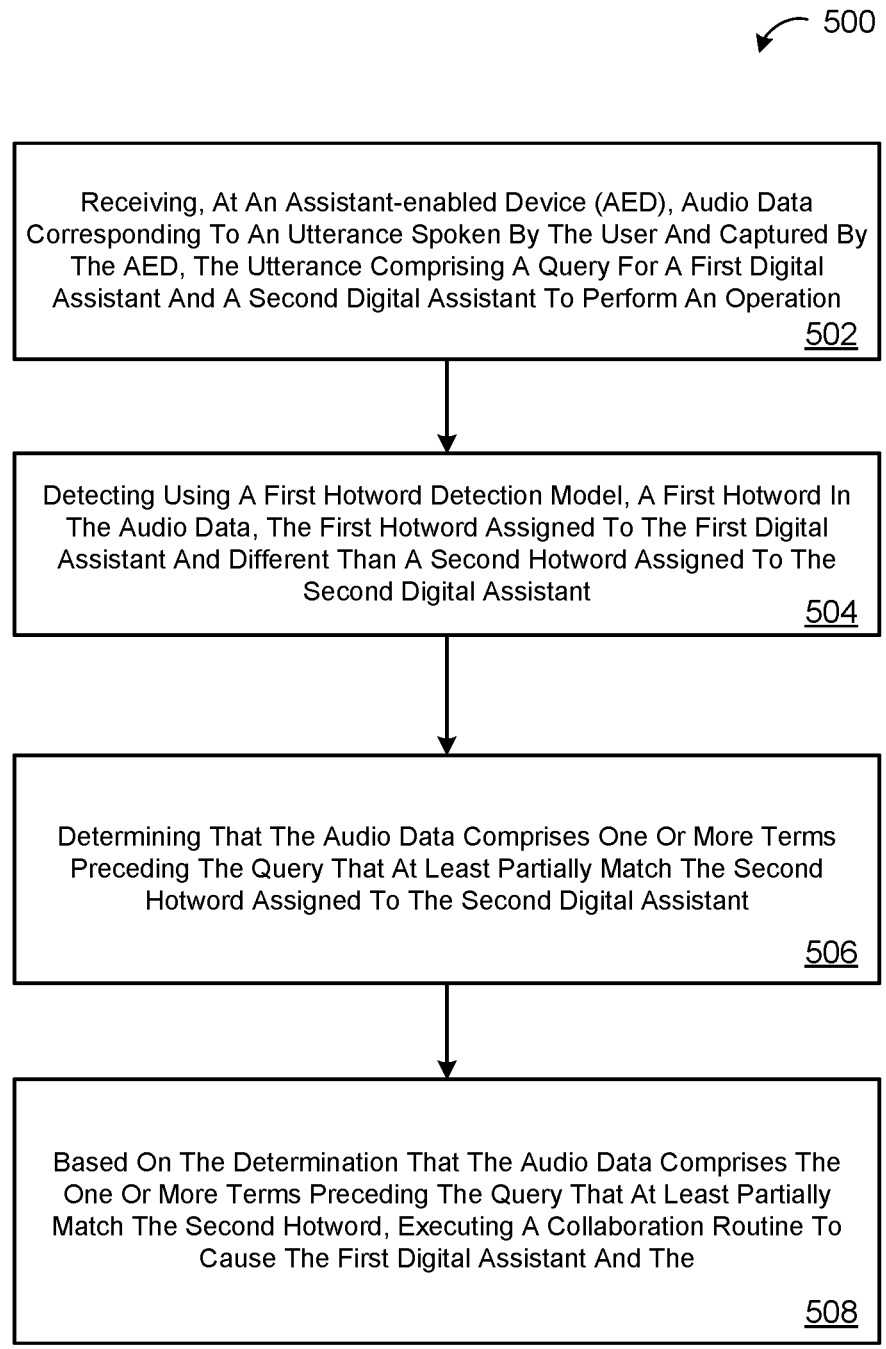
FIG. 5 is a flowchart of an example arrangement of operations for a method of combining assistant specific hotwords in a single utterance.

FIG. 5 is a flowchart of an example arrangement of operations for a method 50 of combining assistant-specific hotwords 24 in a single utterance 20. At operation 502, the method 500 receives, at data processing hardware 112*d* of an assistant-enabled device (AED) 110, 110*a*, audio data 14 corresponding to an utterance 20 spoken by the user 10 and captured by the AED 110*a* where the utterance 20 includes a query 22 for a first digital assistant 120, 120*a* and a second digital assistant 120, 120*b* to perform an operation. At operation 504, the method 500 detects, by the data processing hardware 112*d*, using a first hotword detection model, a first hotword 24, 24*a* in the audio data 14 where the first hotword 24*a* is assigned to the first digital assistant 120*a* and is different than a second hotword 24, 24*b* assigned to the second digital assistant 120*b*. At operation 506, the method 500 determines, by the data processing hardware 112*d*, that the audio data 14 includes one or more terms preceding the query 22 that at least partially matches the second hotword 24*b* assigned to the second digital assistant 120*b*. Based on the determination that the audio data 14 includes the one or more terms preceding the query 22 that at least partially matches the second hotword 24*b*, at operation 508, the method 500 executes, by the data processing hardware 112*d*, a collaboration routine 202 to cause the first digital assistant 120*a* and the second digital assistant 120*b* to collaborate with one another to fulfill performance of the operation.

Figure 6:
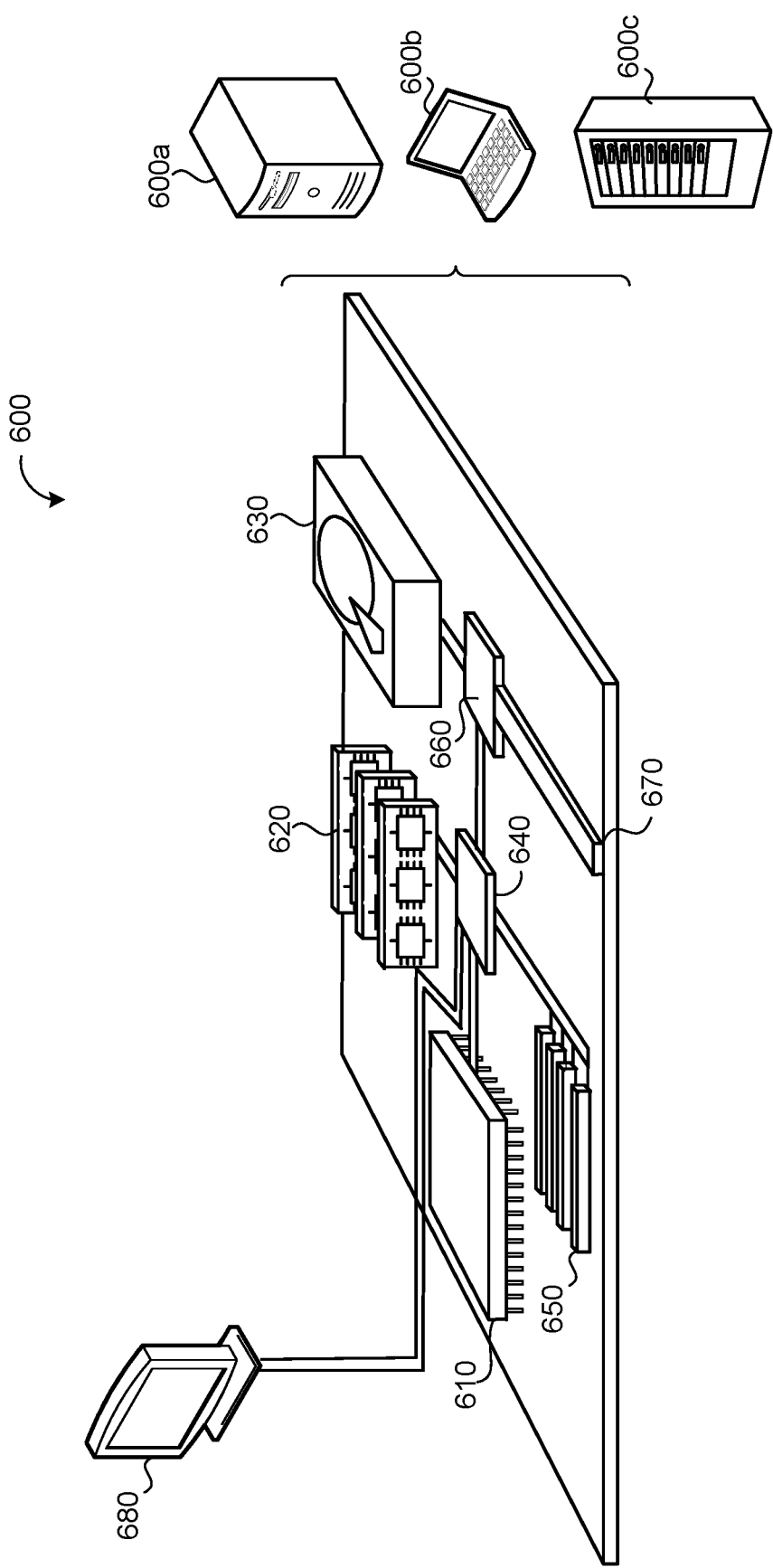
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executing on data processing hardware that causes the data processing hardware to perform operations comprising:
    receiving audio data corresponding to an utterance spoken by a user and captured by an assistant-enabled device (AED), the audio data comprising a query specifying an operation for a first digital assistant and a second digital assistant to perform;
    detecting, using a hotword detection model, a first hotword in the audio data, the first hotword assigned to the first digital assistant and is different than a second hotword assigned to the second digital assistant;
    determining that the audio data includes one or more terms preceding the query that at least partially match the second hotword assigned to the second digital assistant; and
    based on determining that the audio data includes the one or more terms preceding the query that at least partially match the second hotword, executing a collaboration routine that causes the first digital assistant and the second digital assistant to collaborate with one another to fulfill performance of the operation.

2. The method of claim 1, wherein the operations further comprise, in response to detecting the first hotword assigned to the first digital assistant:
    instructing a speech recognizer to perform speech recognition on the audio data to generate a speech recognition result for the audio data,
    wherein determining that the audio data includes the one or more terms preceding the query that at least partially match the second hotword comprises determining, using the speech recognition result for the audio data, the one or more terms that at least partially match the second hotword are recognized in the audio data.

3. The method of claim 2, wherein instructing the speech recognizer to perform speech recognition on the audio data comprises instructing the speech recognizer to execute on the data processing hardware of the AED to perform speech recognition on the audio data.

4. The method of claim 2, wherein instructing the speech recognizer to perform speech recognition on the audio data comprises instructing a server-side speech recognizer to perform speech recognition on the audio data.

5. The method of claim 1, wherein determining that the audio data comprises the one or more terms preceding the query that at least partially match the second hotword assigned to the second digital assistant comprises:
    accessing a hotword registry containing a respective list of one or more hotwords assigned to each of the first digital assistant and the second digital assistant; and
    recognizing the one or more terms in the audio data that match or partially match the second hotword in the respective list of one or more hotwords assigned to the second digital assistant.

6. The method of claim 5, wherein the hotword registry is stored on memory hardware of the AED.

7. The method of claim 5, wherein the hotword registry is stored on a server in communication with the AED.

8. The method of claim 5, wherein determining that the audio data comprises the one or more terms preceding the query that at least partially match the second hotword comprises providing the audio data as input to a machine learning model trained to determine a likelihood of whether a user intended to speak the second hotword assigned to the second digital assistant.

9. The method of claim 1, wherein the data processing hardware executes on the AED.

10. The method of claim 1, wherein the first digital assistant and the second digital assistant each execute on the data processing hardware.

11. An assistant-enabled device (AED) comprising:
   data processing hardware; and
   memory hardware in communication with the data processing hardware, the memory hardware storing instructions that when executed on the data processing hardware cause the data processing hardware to perform operations comprising:
      receiving audio data corresponding to an utterance spoken by a user and captured by the AED, the audio data comprising a query specifying an operation for a first digital assistant and a second digital assistant to perform;
      detecting, using a hotword detection model, a first hotword in the audio data, the first hotword assigned to the first digital assistant and is different than a second hotword assigned to the second digital assistant;
      determining that the audio data includes one or more terms preceding the query that at least partially match the second hotword assigned to the second digital assistant; and
      based on determining that the audio data includes the one or more terms preceding the query that at least partially match the second hotword, executing a collaboration routine that causes the first digital assistant and the second digital assistant to collaborate with one another to fulfill performance of the operation.

12. The AED of claim 11, wherein the operations further comprise, in response to detecting the first hotword assigned to the first digital assistant:
   instructing a speech recognizer to perform speech recognition on the audio data to generate a speech recognition result for the audio data,
   wherein determining that the audio data includes the one or more terms preceding the query that at least partially match the second hotword comprises determining, using the speech recognition result for the audio data, the one or more terms that at least partially match the second hotword are recognized in the audio data.

13. The AED of claim 12, wherein instructing the speech recognizer to perform speech recognition on the audio data comprises instructing the speech recognizer to execute on the data processing hardware of the AED to perform speech recognition on the audio data.

14. The AED of claim 12, wherein instructing the speech recognizer to perform speech recognition on the audio data comprises instructing a server-side speech recognizer to perform speech recognition on the audio data.

15. The AED of claim 11, wherein determining that the audio data comprises the one or more terms preceding the query that at least partially match the second hotword assigned to the second digital assistant comprises:
   accessing a hotword registry containing a respective list of one or more hotwords assigned to each of the first digital assistant and the second digital assistant; and
   recognizing the one or more terms in the audio data that match or partially match the second hotword in the respective list of one or more hotwords assigned to the second digital assistant.

16. The AED of claim 15, wherein the hotword registry is stored on memory hardware of the AED.

17. The AED of claim 15, wherein the hotword registry is stored on a server in communication with the AED.

18. The AED of claim 15, wherein determining that the audio data comprises the one or more terms preceding the query that at least partially match the second hotword comprises providing the audio data as input to a machine learning model trained to determine a likelihood of whether a user intended to speak the second hotword assigned to the second digital assistant.

19. The AED of claim 11, wherein the data processing hardware executes on the AED.

20. The AED of claim 11, wherein the first digital assistant and the second digital assistant each execute on the data processing hardware.

* * * * *